United States Patent
Shirata (10) Patent No.: US 10,739,764 B2
(45) Date of Patent: Aug. 11, 2020

(54) DIAGNOSTIC APPARATUS, DIAGNOSTIC SYSTEM, DIAGNOSTIC METHOD, AND RECORDING MEDIUM

(71) Applicant: Yasunobu Shirata, Tokyo (JP)

(72) Inventor: Yasunobu Shirata, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 558 days.

(21) Appl. No.: 15/635,304

(22) Filed: Jun. 28, 2017

(65) Prior Publication Data

US 2018/0017960 A1    Jan. 18, 2018

(30) Foreign Application Priority Data

Jul. 15, 2016 (JP) .................. 2016-140726
Apr. 26, 2017 (JP) .................. 2017-087256

(51) Int. Cl.
| | |
|---|---|
| G05B 23/02 | (2006.01) |
| G01M 99/00 | (2011.01) |
| G05B 19/4065 | (2006.01) |
| G01M 13/00 | (2019.01) |
| H04L 29/08 | (2006.01) |

(52) U.S. Cl.
CPC ......... *G05B 23/0221* (2013.01); *G01M 13/00* (2013.01); *G01M 99/008* (2013.01); *G05B 19/4065* (2013.01); *G05B 23/0283* (2013.01); *G05B 2219/31151* (2013.01); *G05B 2219/32179* (2013.01); *G05B 2219/37252* (2013.01); *G05B 2219/49308* (2013.01); *H04L 67/12* (2013.01)

(58) Field of Classification Search
CPC ................................. G05B 23/0221
See application file for complete search history.

(56) References Cited

U.S. PATENT DOCUMENTS

| | | | |
|---|---|---|---|
| 2017/0320182 A1* | 11/2017 | Jeong | ............ B23Q 17/098 |
| 2018/0046902 A1* | 2/2018 | Liao | ............ G06N 3/088 |

FOREIGN PATENT DOCUMENTS

| | | |
|---|---|---|
| JP | 2006-184722 | 7/2006 |
| JP | 2008-137102 | 6/2008 |

* cited by examiner

*Primary Examiner* — Manuel A Rivera Vargas
(74) *Attorney, Agent, or Firm* — Harness, Dickey & Pierce, P.L.C.

(57) ABSTRACT

A diagnostic apparatus includes: a receiver to receive, from a diagnosis target device, context information corresponding to a current operation on the target device and tool information regarding a tool being used for the current operation on the target device, the context information corresponding to the current operation being one of a plurality of items of context information that have been determined by respective types of a plurality of types of operation applicable to the target device; and circuitry to obtain detection information of a physical quantity varying with the current operation on the target device, and to determine a level of degradation of the tool being used, using the detection information and a model corresponding to a combination of the received context information and the received tool information, the model being specified from one or more models respectively corresponding to available combinations of context information and tool information using the received combination of context information and tool information.

20 Claims, 9 Drawing Sheets

| TOOL INFORMATION (DRILL DIAMETER) | NAME OF LEARNING MODEL |
|---|---|
| DIAMETER OF 1 mm | DIAMETER 1 MODEL |
| DIAMETER OF 3 mm | DIAMETER 3 MODEL |
| DIAMETER OF 5 mm | DIAMETER 5 MODEL |

DIAGNOSTIC APPARATUS, DIAGNOSTIC SYSTEM, DIAGNOSTIC METHOD, AND RECORDING MEDIUM

CROSS-REFERENCE TO RELATED APPLICATIONS

This patent application is based on and claims priority pursuant to 35 U.S.C. § 119(a) to Japanese Patent Application Nos. 2016-140726, filed on Jul. 15, 2016, and 2017-087256, filed on Apr. 26, 2017, in the Japan Patent Office, the entire disclosure of which is hereby incorporated by reference herein.

BACKGROUND

Technical Field

The present invention relates to a diagnostic apparatus, a diagnostic system, a diagnostic method, and a recording medium.

Description of the Related Art

For an imaging device, a technique has been known in which operation sound data collected with a sound collecting unit is compared to preliminarily prepared operation sound data in each operation state based on context information to detect abnormality.

SUMMARY

Example embodiments of the present invention include a diagnostic apparatus, which includes: a receiver to receive, from a diagnosis target device, context information corresponding to a current operation on the target device and tool information regarding a tool being used for the current operation on the target device, the context information corresponding to the current operation being one of a plurality of items of context information that have been determined by respective types of a plurality of types of operation applicable to the target device; and circuitry to obtain detection information of a physical quantity varying with the current operation on the target device, and to determine a level of degradation of the tool being used, using the detection information and a model corresponding to a combination of the received context information and the received tool information, the model being specified from one or more models respectively corresponding to available combinations of context information and tool information using the received combination of context information and tool information.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of a diagnostic apparatus, a diagnostic system, a diagnostic method, and a recording medium are described in detail below with reference to the accompanying drawings.

Figure 1:
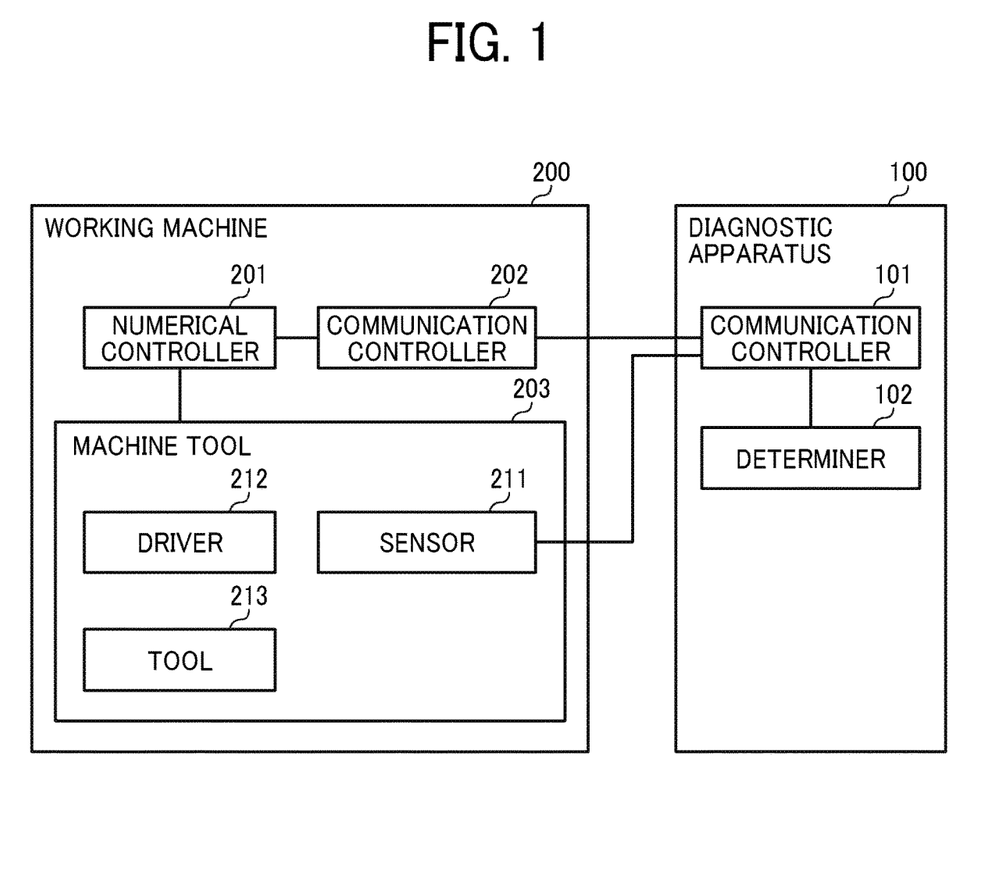
FIG. 1 is a block diagram illustrating an example of configuration of a diagnostic system according to an embodiment.

FIG. 1 is a block diagram illustrating an example of configuration of a diagnostic system according to a first embodiment. As illustrated in FIG. 1, the diagnostic system includes a working machine 200 and a diagnostic apparatus 100. The working machine 200 is an example of a target device that is subjected to diagnosis by the diagnostic apparatus 100.

The working machine 200 and the diagnostic apparatus 100 are coupled with each other in any desired way. For example, the working machine 200 and the diagnostic apparatus 100 are connected via a wired network using such as a cable, or via a wireless network, to form a local area network (LAN), for example. Alternatively or additionally, the network may include the Internet.

The working machine 200 includes a numerical controller 201, a communication controller 202, and a machine tool 203. The machine tool 203 includes a sensor 211, a driver 212, and a tool 213.

The machine tool 203 is a machine for shaping or machining a target under control of the numerical controller 201. The machine tool 203 includes the driver 212, which is operated by control of the numerical controller 201. The driver 212 is, for example, a motor. The driver 212 may include one or more drivers.

The tool 213 is an operation target that is practically driven by the driver 212. The tool 213 may be anything that is used for machining and subjected to numerical controlling, e.g., a drill and an end mill for machining on a target object.

The numerical controller 201 carries out machining with the machine tool 203 through numerical control. For example, the numerical controller 201 generates and outputs numerical control data for controlling the operation of the driver 212. In addition, the numerical controller 201 outputs context information and tool information to the communication controller 202.

The context information is a plurality of pieces of information specified for respective types of operation of the working machine 200. The context information includes, for example, information for identifying the tool 213 driven by the driver 212, the number of rotations of the driver 212, the rotation rate of the driver 212, a load applied to the driver 212, the movement information of the driver 212 and the tool 213, and the accumulated use time from the beginning of use of the driver 212.

The tool information is information regarding a tool (tool 213) of the machine tool 203 for use in operation of the working machine 200, i.e., a tool (tool 213) driven by the driver 212. For example, the tool information includes information regarding the tool 213, e.g., a drill and an end mill driven by the driver 212, including the size (diameter) of the tool 213 and as to whether the tool 213 is brand new or used.

In the present embodiment, the context information and the tool information are managed separately from each other. The tool information, however, may be a part of the context information.

For example, the numerical controller 201 transmits the tool information and the context information indicating the current operation to the diagnostic apparatus 100 via the communication controller 202. The numerical controller 201 changes the type of the tool 213 driven by the driver 212 for driving and the driving state (the number of rotations, the rotation rate, or the like) of the driver 212, depending on a machining process during machining of a machining target. The numerical controller 201 sequentially transmits the context information corresponding to the type of the changed operation to the diagnostic apparatus 100 via the communication controller 202 every time the type of operation is changed.

Figure 2:
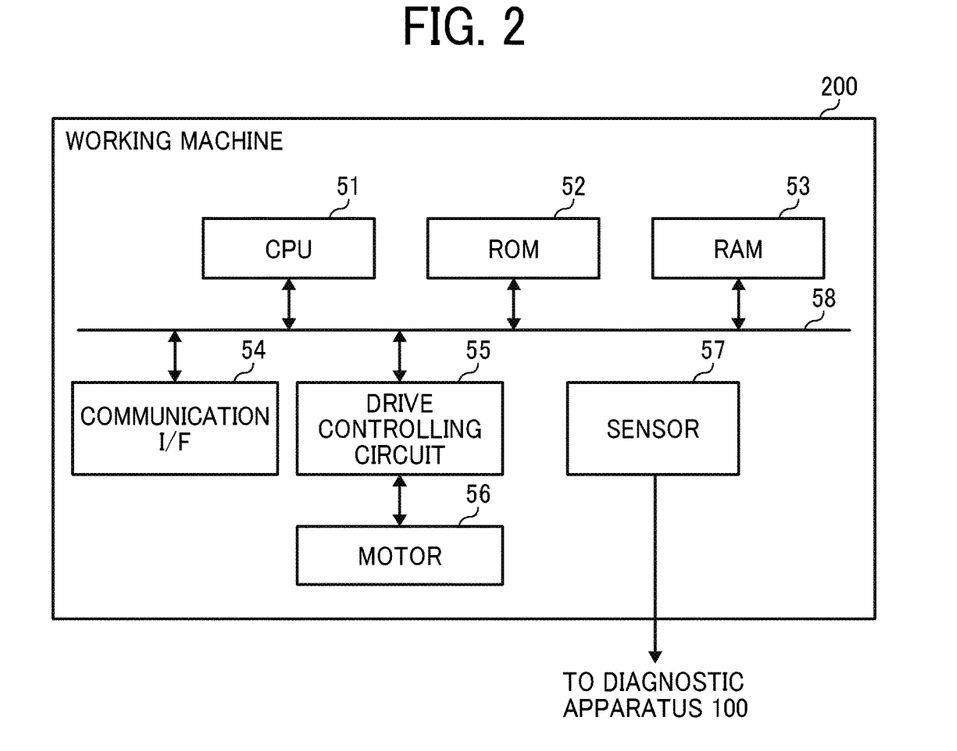
FIG. 2 is a block diagram illustrating an example of configuration of hardware of a working machine of the diagnostic system of FIG. 1.

The communication controller 202 controls communication with an external device, e.g., the diagnostic apparatus 100. For example, the communication controller 202 may be a network interface card (NIC), which transmits the tool information and the context information corresponding to the current operation to the diagnostic apparatus 100, under control of a CPU 51 (FIG. 2).

The sensor 211, one example of detecting unit, detects a physical quantity that varies with the operation of the working machine 200 and outputs detection information (sensor data). The type of the sensor 211 and the physical quantity to be detected may be of any type. For example, the sensor 211 may be a microphone, an acceleration sensor, or an acoustic emission AE sensor, and the detection information may be acoustic data, acceleration data, or data indicating an AE wave. In addition, the number of the sensors 211 may be any number. A plurality of sensors 211 for detecting the same physical quantity may be included, and a plurality of sensors 211 for detecting different physical quantities may be included.

Further, any one of the sensors 211 may be provided inside or outside the working machine 200, as long as it is capable of detecting the physical quantity to be detected, either directly or indirectly from the working machine 200. For example, the sensor 211 may be attached to an outer face of the working machine 200, or may be provided independently from the working machine 200. For example, the sensors 211 may be attached to the outer face of the working machine 200, after the working machine 200 has been shipped to the user site. Alternatively, the sensors 211 may be attached to the outer face of, or incorporated into, the working machine 200, before the working machine 200 is shipped to the user site.

For example, when snapping or chipping of the blade of the tool (tool 213) for use in machining occurs, the sound during machining varies. Therefore, the acoustic data is detected with the sensor 211 (microphone) and is compared to a model, so that the level of degradation of the tool (tool 213) can be understood at any time.

The diagnostic apparatus 100 includes a communication controller 101 and a determiner 102. The communication controller 101 controls communication with an external device, e.g., the working machine 200. For example, the communication controller 101 receives the tool information, the context information, and the detection information from the working machine 200. The determiner 102 refers to the tool information, the context information, and the detection information, and determines how much more the tool in question can be used according to the level of degradation of the tool (tool 213) of the working machine 200. The functions of the above-described units will be described in detail below.

FIG. 2 is a block diagram illustrating an example of configuration of hardware of the working machine 200. As illustrated in FIG. 2, the working machine 200 includes the central processing unit (CPU) 51, a read only memory (ROM) 52, a random access memory (RAM) 53, a communication interface (I/F) 54, a drive controlling circuit 55, and a motor 56, which are connected with one another via a bus 58.

The CPU 51 controls entire operation of the working machine 200. For example, the CPU 51 executes a program stored in the ROM 52 or the like in the RAM 53, which serves as a work area, to control the operation of the working machine 200 so as to implement a machining function.

Specifically, the numerical controller 201 and the communication controller 202 of FIG. 1 are implemented by the CPU 51 of FIG. 2 executing a software program.

The communication I/F 54 is an interface for communication with an external device, e.g., the diagnostic apparatus 100. The drive controlling circuit 55 is a circuit for controlling the drive of the motor 56. The motor 56 drives the tool (tool 213) for use in machining, e.g., a drill, a cutter, and a table. For example, the motor 56 corresponds to the driver 212 of FIG. 1. A sensor 57 is attached to the working machine 200. The sensor 57 detects a physical quantity that varies with the operation of the working machine 200, and outputs the detection information to the diagnostic apparatus 100. For example, the sensor 57 corresponds to the sensor 211 of FIG. 1.

In the present embodiment, the numerical controller 201 and the communication controller 202 of FIG. 1 are implemented by the CPU 51 of FIG. 2 executing a software program. However, the present embodiment is not limited to the above. For example, the numerical controller 201 and communication controller 202 of FIG. 1 may be implemented by hardware, e.g., an integrated circuit (IC), or may be implemented by a combination of software and hardware.

Figure 3:
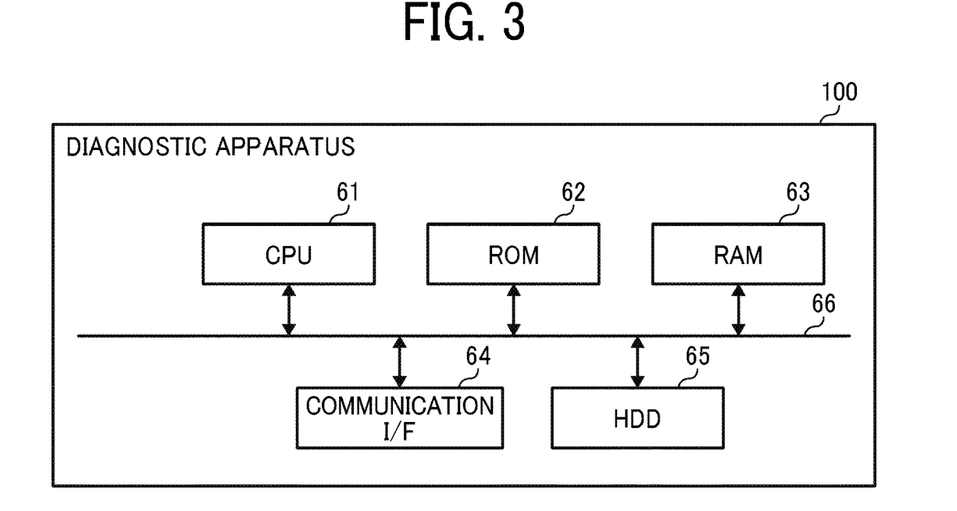
FIG. 3 is a block diagram illustrating an example of configuration of hardware of a diagnostic apparatus of the diagnostic system of FIG. 1.

FIG. 3 is a block diagram illustrating an example of configuration of hardware of the diagnostic apparatus 100. As illustrated in FIG. 3, the diagnostic apparatus includes a CPU 61, a ROM 62, a RAM 63, a communication 64, and a hard disk drive (HDD) 65, which are connected with one another via a bus 66.

The CPU 61 controls entire operation of the diagnostic apparatus 100. For example, the CPU 61 executes a program stored in the ROM 62 or the like in the RAM 63, which serves as a work area, to control the operation of the diagnostic apparatus 100 so as to implement a diagnostic function. The communication I/F 64 is an interface for communication with an external device, e.g., the working machine 200. The HDD 65 stores information including setting information of the diagnostic apparatus 100 and the detection information received from the working machine 200. Instead of or together with the HDD 65, a non-volatile storage device, e.g., an electrically erasable programmable read-only memory (EEPROM) or a solid state drive (SSD), may be provided to the diagnostic apparatus 100.

Figure 4:
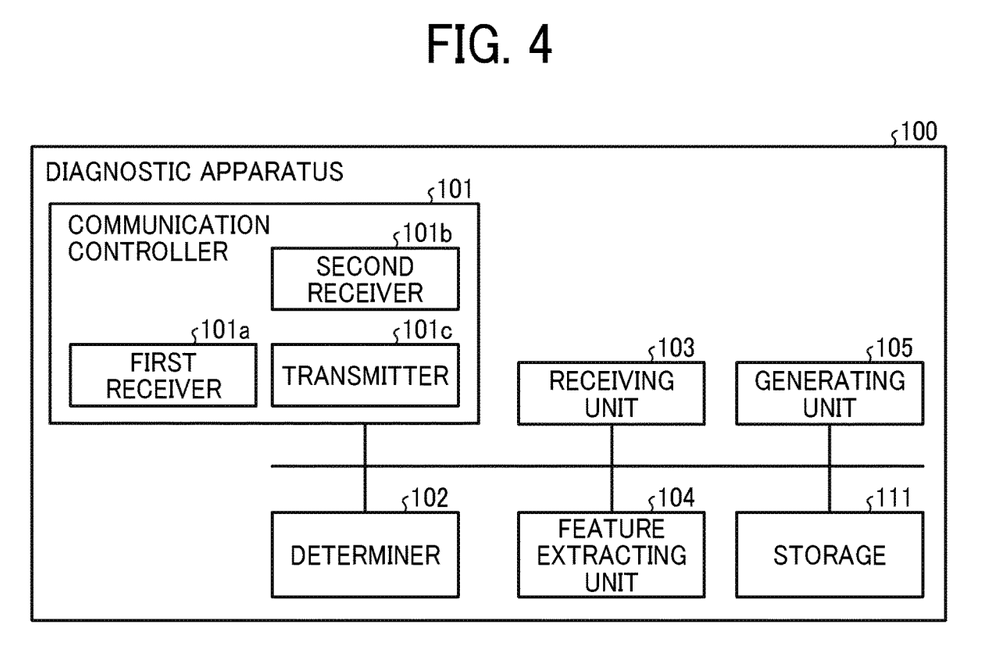
FIG. 4 is a block diagram illustrating an example of a functional configuration of the diagnostic apparatus, according to a first embodiment.

FIG. 4 is a block diagram illustrating an example of a functional configuration of the diagnostic apparatus 100. As illustrated in FIG. 4, the diagnostic apparatus 100 includes a receiving unit 103, a feature extracting unit 104, a generating unit 105, and a storage 111 in addition to the communication controller 101 and the determiner 102 described above.

Each unit (the communication controller 101, the determiner 102, the receiving unit 103, the feature extracting unit 104, and the generating unit 105) of FIG. 4 is implemented as the CPU 61 of FIG. 3 executing a software program.

The storage 111 stores various types of information required for the diagnostic function of the diagnostic apparatus 100. For example, the storage 111 can be implemented by the RAM 63 or the HDD 65 of FIG. 3. For example, the storage 111 stores one or more models used for determining the level of degradation of the tool (tool 213).

For example, the models are generated through learning using the detection information that is detected during machining with the tool (tool 213) during the time in which the tool (tool 213) of the working machine 200 in a brand new state becomes an unusably worn-out state. Regarding learning, for example, the time from the beginning of use (time in brand new state) to the time when the tool becomes unusable (time when the tool becomes unusably worn-out state) is partitioned into five equal parts along temporal axis, and five models are generated to correspond to the detection information partitioned into five ranges. In the present embodiment, as an example, the time is partitioned into five parts. However, the partition number is not limited to the above.

The learning method may be any method and the type of a learning model may be any type. For example, a model, e.g., a Gaussian mixture model (GMM) and a hidden Markov model (HMM), and a corresponding model learning method may be applied.

In the present embodiment, the models are generated for respective combinations of the tool information and the context information. For example, the storage 111 associates and stores the three: the tool information, the context information, and the model corresponding to the combination of the tool information and the context information.

Figure 5:
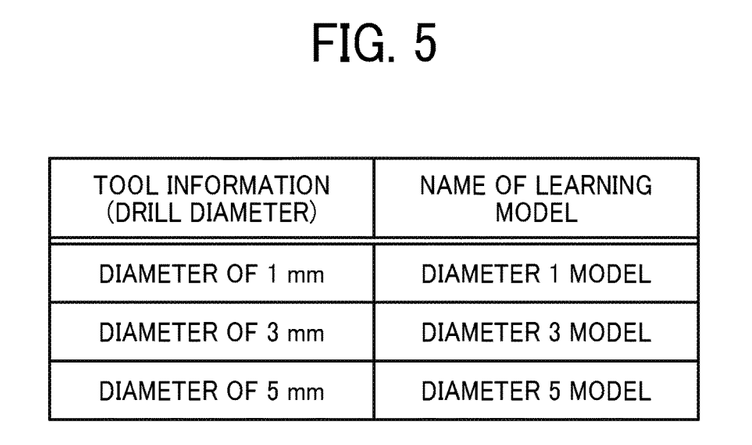
FIG. 5 is a table illustrating an example of correspondence between tool information and models.

FIG. 5 is a table illustrating an example of correspondence between tool information and models. As illustrated in FIG. 5, for example, the models are generated for respective tools 213 to be attached to the working machine 200. When the tool 213 is a drill, the models are generated for respective diameters of the drill. When the drill has three diameters: a diameter of 1 mm, a diameter of 3 mm, and a diameter of 5 mm, the models are generated with respect to respective diameters. Furthermore, for example, when the determiner 102 recognizes the drill diameter used in machining based on the tool information received from the working machine 200, the determiner 102 selects a learning model that matches the drill diameter, and uses the learning model for determination.

Similarly to the tool information, the context information is also associated with the model. For example, when there are different numbers of rotations of the driver 212 depending on the operation of the working machine 200, the model is generated with respect to each of the different numbers of rotations. Furthermore, for example, when the determiner 102 recognizes the number of rotations based on the context information received from the working machine 200, the determiner 102 selects a learning model that matches the number of rotations and uses the learning model for determination. In other words, the determiner 102 combines the context information and the tool information, and selects a learning model suitable for the combination, and uses the learning model for determination.

Referring back to FIG. 4, the communication controller 101 includes a first receiver 101*a*, a second receiver 101*b*, and a transmitter 101*c*. The first receiver 101*a* receives various types of information transmitted from an external device, e.g., the working machine 200. For example, the first receiver 101*a* receives the context information corresponding to the current operation of the working machine 200 and the tool information from the working machine 200. The second receiver 101*b* receives the detection information transmitted from the sensor 211, which may be provided inside or outside the working machine 200. The transmitter 101*c* transmits various types of information to the external device. The first receiver 101*a*, second receiver 101*b*, and transmitter 101*c* may be implemented by the CPU 61, which operates in cooperation with the communication I/F 64.

The feature extracting unit 104 extracts feature information (feature quantity) for use in generation of the model and determination with the determiner 102 from the detection information. The feature information may be any information that indicates the feature of detection information. For example, when the detection information is acoustic data that is collected with a microphone, the feature extracting unit 104 may extract a feature quantity, e.g., energy, frequency spectrum, and mel-frequency cepstrum coefficients (MFCC).

The generating unit 105 generates models for determining the level of degradation (in the present embodiment, the level of degradation is determined in five stages) through learning using the feature information that is extracted from the detection information corresponding to the context information during the time from the beginning of use of the tool (tool 213) to the time when the tool becomes unusable. When the model is generated with the external device, the generating unit 105 may not be included. When detection information corresponding to the combination of context information and tool information for which a model is not specified is input, the generating unit 105 may use feature information extracted from the detection information and generate a model that corresponds to the context information and the tool information.

The determiner 102 uses (obtains) the detection information of the sensor 211 that the second receiver 101b has received and the model corresponding to the tool information and the context information that the first receiver 101a has received, and calculates the level of degradation of the tool (tool 213) used in the working machine 200. For example, the determiner 102 requests extraction of feature information from the detection information to the feature extracting unit 104.

The determiner 102 uses (obtains) a corresponding model to calculate a likelihood that indicates a possibility as to which level of degradation stage among the five stages the feature information extracted from the detection information corresponds. The determiner 102 selects the level of degradation corresponding to the model that has been calculated to have the highest likelihood.

In addition, the determiner 102 determines the time remaining before the tool (tool 213) becomes unusable depending on the level of degradation of the tool (tool 213).

For example, regarding the tool (tool 213) that takes a time of five months from the beginning of use to the time when the tool becomes unusable, when the level of degradation of the tool (tool 213) is calculated to be three by the aforementioned method, the remaining time before the tool becomes unusable is:

$(5-3)/5 \times 5$ [months]=2 [months].

In addition, for example, regarding the tool (tool 213) that takes a time of ten months before the tool (tool 213) becomes unusable, when the level of degradation of the tool (tool 213) is calculated to be three by the aforementioned method, the remaining time before the tool becomes unusable is:

$(5-3)/5 \times 10$ [months]=4 [months].

The method for calculating the remaining time before the tool becomes unusable based on the level of degradation of the tool (tool 213) is not limited to the above.

In addition, the determiner 102 updates the time of beginning of use and resets the calculated level of degradation when the tool (tool 213) is changed to a new tool (tool 213).

The receiving unit 103 receives an input of information that is different from the tool information or the context information that the first receiver 101a receives from the working machine 200. For example, the receiving unit 103 may obtain the information of a material to be machined (material property) from the working machine 200. In this case, when a material that is different from a previous material is machined, the working machine 200 may include a function of switching the model for calculating the level of degradation to a model corresponding to the material to be machined, the tool (tool 213) to be used, and the context information.

The information of a material to be machined may not be obtained from the working machine 200, but the receiving unit 103 may receive the information. For example, the receiving unit 103 receives the context information or the tool information that is input from an operating unit, e.g., a keyboard and a touch panel. The receiving unit 103 may receive the context information or the tool information from an external device, e.g., a server device and a personal computer. When there is no need to receive the context information or the tool information other than from the working machine 200, the receiving unit 103 may not be included.

In the present embodiment, each unit (the communication controller 101, the determiner 102, the receiving unit 103, the feature extracting unit 104, and the generating unit 105) of FIG. 4 is implemented by the CPU 61 of FIG. 3 executing a software program. However, the present embodiment is not limited to the above. For example, each unit (the communication controller 101, the determiner 102, the receiving unit 103, the feature extracting unit 104, and the generating unit 105) of FIG. 4 may be implemented by hardware, e.g., an IC, or may be implemented by a combination of software and hardware.

Figure 6:
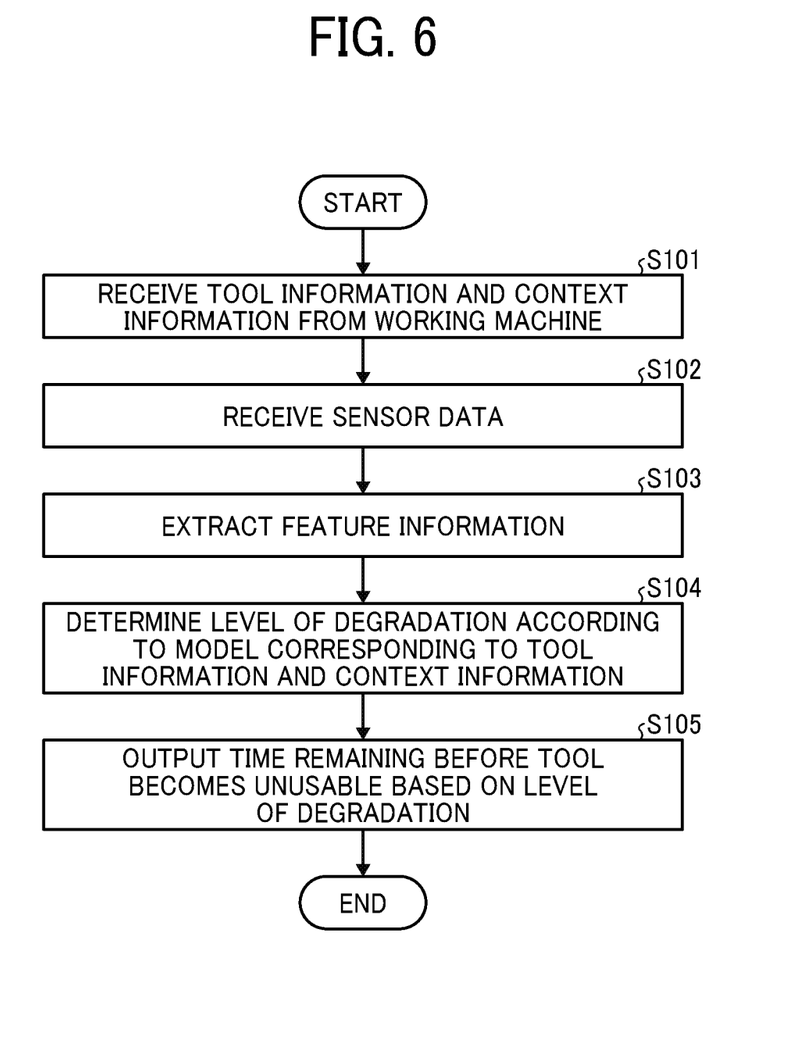
FIG. 6 is a flowchart illustrating an example of diagnostic processing.

Next, diagnostic processing with the diagnostic apparatus 100 according to the first embodiment is described in conjunction with FIG. 6. FIG. 6 is a flowchart illustrating an example of flow of diagnostic processing.

As described above, the numerical controller 201 of the working machine 200 sequentially transmits the tool information and the context information indicating the current operation to the diagnostic apparatus 100. At the diagnostic apparatus 100, the first receiver 101a receives the tool information and the context information transmitted from the working machine 200 in the aforementioned manner (step S101). In addition, the sensor 211 of the working machine 200 sequentially outputs the detection information (sensor data) obtained during machining. The second receiver 101b of the diagnostic apparatus 100 receives the detection information (sensor data) transmitted from the sensor 211 in the aforementioned manner (step S102). S101 and S102 may be performed in any desired order, or concurrently.

The feature extracting unit 104 extracts feature information from the received detection information (step S103). The determiner 102 uses the extracted feature information and the model corresponding to the received tool information and context information to determine the level of degradation of the tool (tool 213) of the working machine 200 (step S104). The determiner 102 outputs the time remaining before the tool (tool 213) becomes unusable based on the level of degradation (step S105).

For example, when the diagnostic apparatus 100 includes a display device, e.g., a display, the determiner 102 may display determination results on the display device. The determiner 102 may output determination results to an external device, e.g., a server device and a personal computer.

Figure 7:
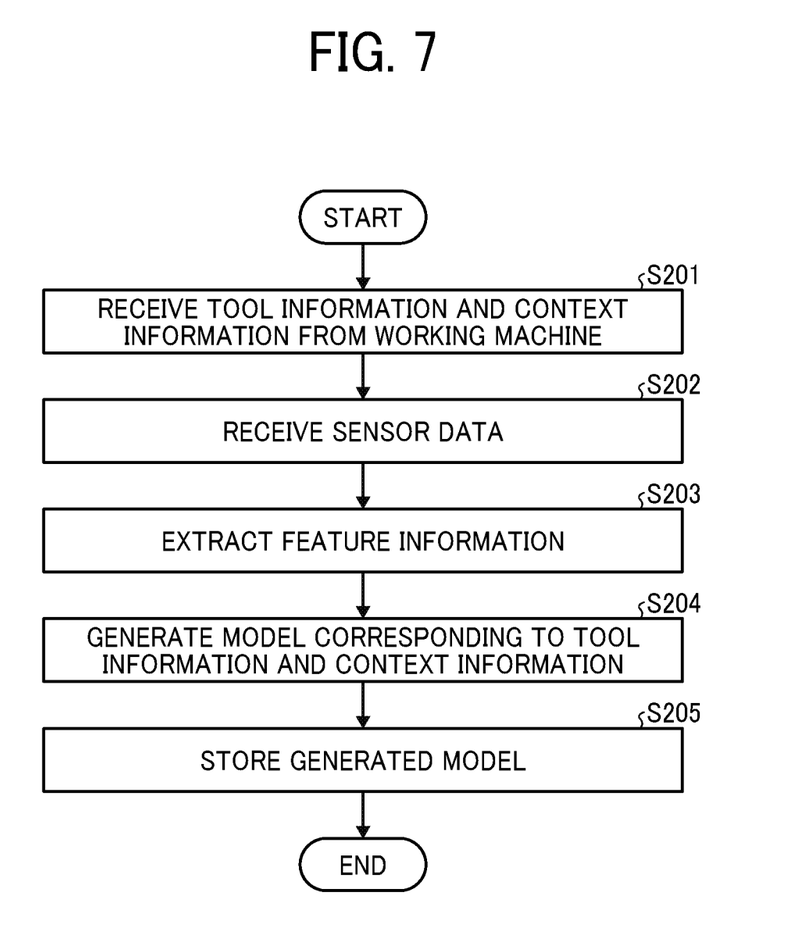
FIG. 7 is a flowchart illustrating an example of model generation processing.

Next, model generation processing with the diagnostic apparatus 100 according to the first embodiment is described in conjunction with FIG. 7. FIG. 7 is a flowchart illustrating an example of model generation processing. For example, the model generation processing is executed in advance of the diagnostic processing. As described above, the model generation processing may be executed when the context information or the tool information for which a model is not specified is input. In addition, as described above, when the model is externally generated, the model generation processing may not be executed.

The first receiver 101a of the diagnostic apparatus 100 receives the context information and the tool information transmitted from the working machine 200 (step S201). The second receiver 101b receives the detection information (sensor data) transmitted from the sensor 211 (step S202).

The tool information, the context information, and the detection information received in the aforementioned manner are used for model generation. The models are generated for respective pieces of the tool information and the context information. Therefore, the detection information is required to be associated with the corresponding tool information and context information. Thus, for example, the first receiver 101a associates the received detection information with the tool information and the context information received at substantially the same timing, and stores the detection information in the storage 111 or the like. Each piece of information is temporarily stored in the storage 111 or the like, an elapsed time from the beginning of use of the tool (tool 213) is checked from the tool information, and the pieces of detection information on the elapsed time segmented over a predetermined range are collected together to generate the models. For example, the models may be generated according to detection information in which an elapsed time of zero to one month is labeled as "Range 1", an elapsed time of one to two months is labeled as "Range 2", . . . an elapsed time of four to five months is labeled as "Range 5" depending on the elapsed time from the beginning of use.

Labeling may be carried out at any timing after the information is stored in the storage 111 or the like or may be carried out in real time while the working machine 200 is operated.

The feature extracting unit 104 extracts feature information from the collected detection information (step S203). The generating unit 105 uses the feature information extracted from the detection information associated with the combination of the same context information and tool information, and generates the model regarding the combination of the context information and the tool information (step S204). The model to be generated is linked not only to the context information, but also to the tool information, and the model is also generated with respect to the same context information and different tool information.

For example, the generating unit 105 stores the generated model in the storage 111 (step S205).

Figure 8:
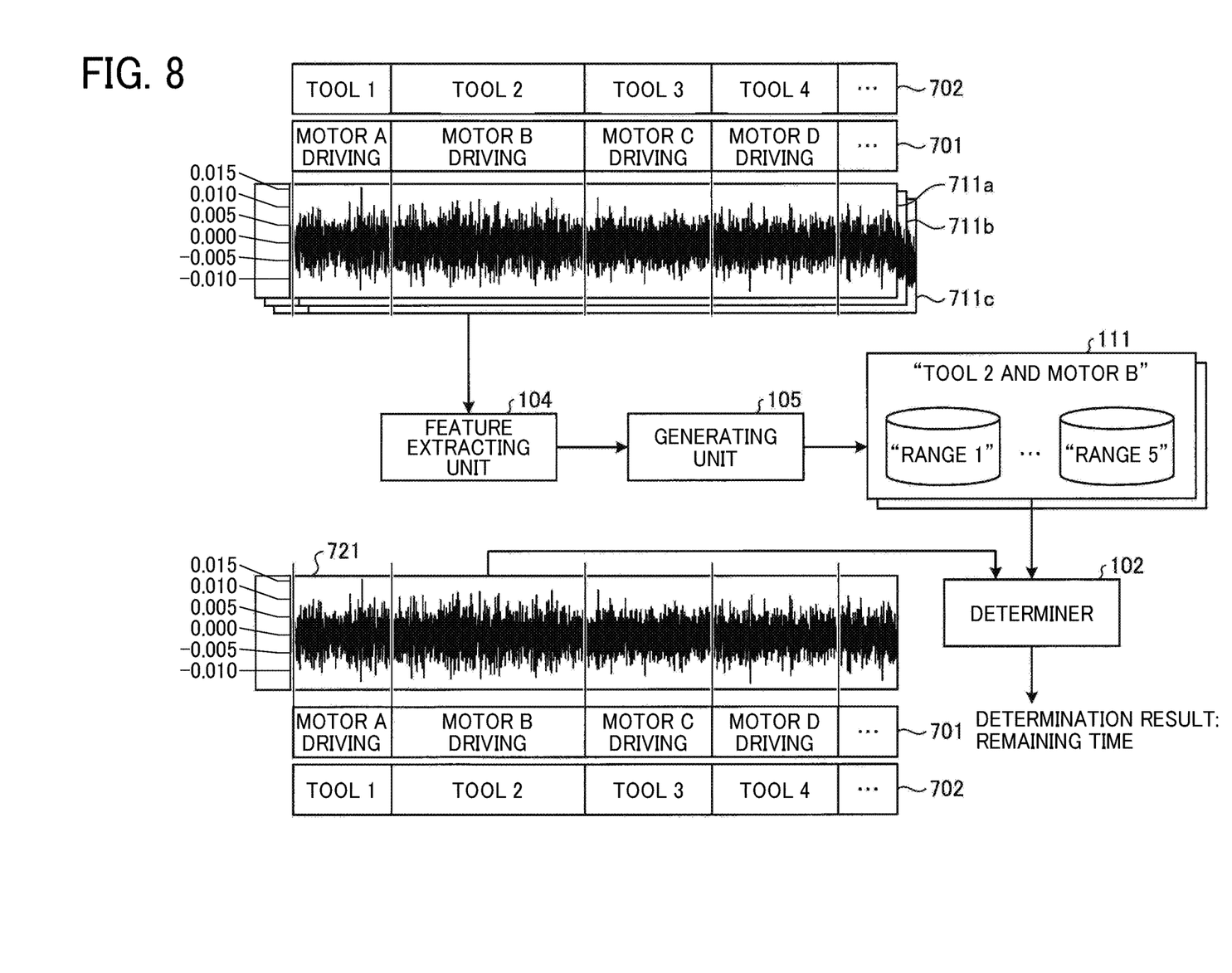
FIG. 8 is a diagram for explaining a specific example of model generation processing and diagnostic processing.

Next, a specific example of the model generation processing and the diagnostic processing according to the present embodiment is described. FIG. 8 is a diagram for explaining a specific example of the model generation processing and the diagnostic processing.

For example, FIG. 8 illustrates the model generation processing and the diagnostic processing regarding a part of a process for machining a given part. In the model generation processing, a plurality of pieces of detection information (in FIG. 8, detection information 711a to 711c) received together with context information 701 and tool information 702 are used. The number of pieces of detection information is not limited to three, but may be any number.

The context information 701 indicates that the machining process includes the operation of driving four motors (Motor A, Motor B, Motor C, and Motor D). The tool information 702 indicates tools (tools 213) used for driving the motors (Motor A, Motor B, Motor C, and Motor D).

The feature extracting unit 104 extracts feature information from the received detection information.

The generating unit 105 uses the feature information extracted from the corresponding detection information and generates the models for the pieces of the context information and the tool information corresponding to the respective motors. The generated models are stored in the storage 111 or the like for respective combinations of the context information and the tool information. FIG. 8 illustrates an example in which the model ("Tool 2 and Motor B") generated with respect to the context information in which Tool 2 is used to drive Motor B is stored in the storage 111.

The models are generated based on the detection information of respective ranges such that an elapsed time of zero to one month is expressed as "Range 1", an elapsed time of one to two months is expressed as "Range 2", . . . an elapsed time of four to five months is expressed as "Range 5" depending on the elapsed time from the beginning of use. The stored models are referred to in subsequent diagnostic processing.

In the diagnostic processing, similarly to the model generation processing, detection information 721 is received together with the context information 701 and the tool information 702. When the context information 701 indicates that "Motor B is driven" and the tool information 702 indicates that "Tool 2 is used", for example, the determiner 102. uses the detection information received during the time in which the context information 701 and the tool information 702 are received and the model "Tool 2 and Motor B" stored in the storage 111, and determines the remaining usable time of Tool 2, which is used in the working machine 200.

Thus, a user is able to refer to the remaining usable time of the tool (tool 213) to prepare a spare tool (tool 213) or preliminarily know the time of changing to a new tool (tool 213). In addition, the user is able to quickly respond to a state where the tool (tool 213) is practically unusable, enabling an increase in maintenance efficiency.

Figure 9:
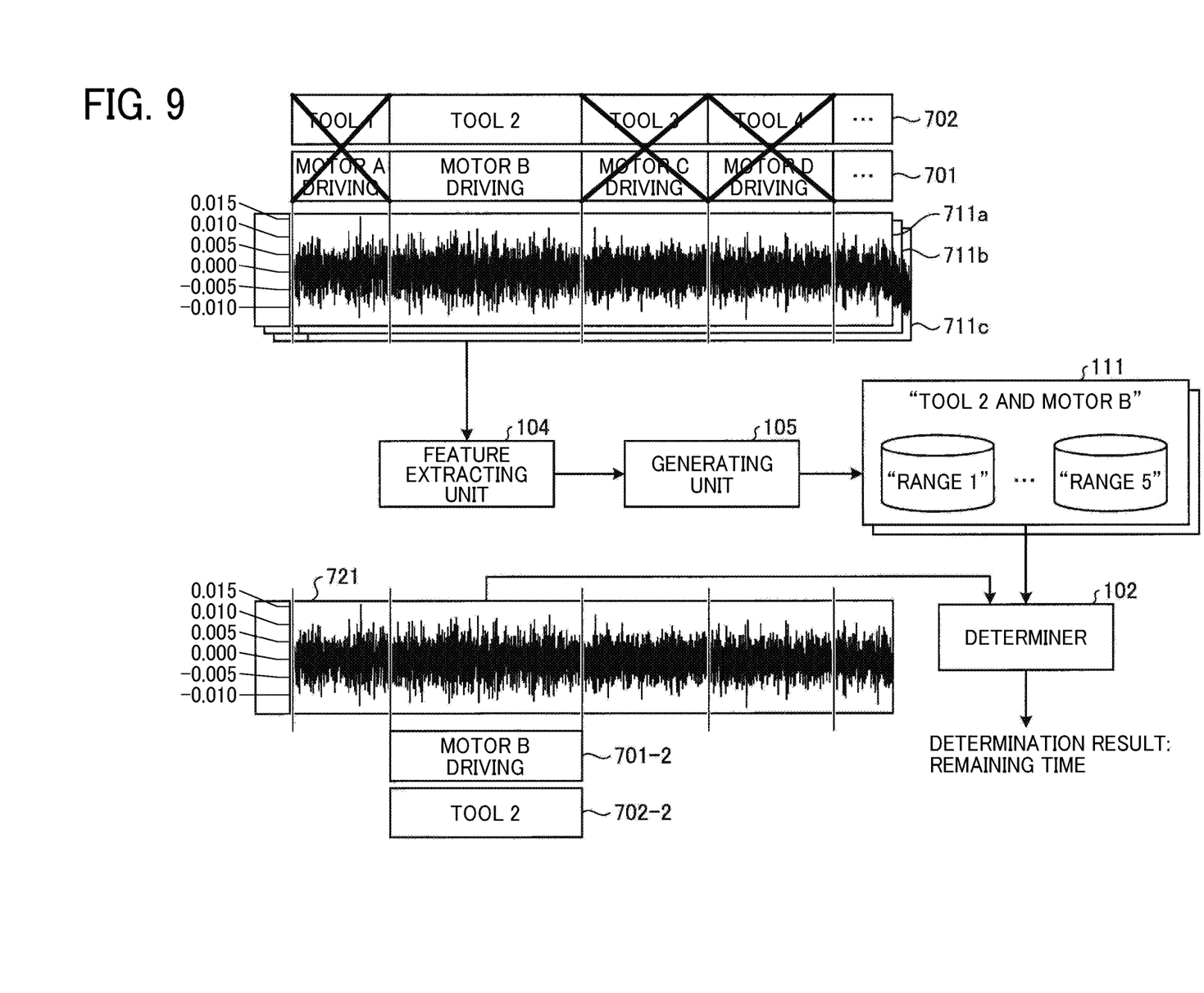
FIG. 9 is a diagram illustrating an example of carrying out determination with respect to partial tool information and context information.

Similarly, when different tool information and context information are received, the determiner 102 uses corresponding detection information and a corresponding model to carry out determination. Determination may not be carried out for all the tool information and context information. FIG. 9 is a diagram illustrating an example of carrying out determination with respect to a part of tool information and context information.

In the example of FIG. 9, the model is generated only when the tool information indicates that "Tool 2 is used" and the context information indicates that "Motor B is driven". In addition, the diagnostic processing is executed when tool information 702-2 indicating that the "Tool 2 is used" and context information 701-2 indicating that "Motor B is driven" are received. Thus, only detection information that is effective for determination can be used to execute the diagnostic processing. For example, when acoustic data is used as detection information, in some cases, an interval that is not required to be subjected to determination, e.g., an interval of silence, is included in a machining process. Removing such an unnecessary interval from a determination target enables a reduction in erroneous determination and calculation cost. Specifically, high precision and efficient diagnostic processing can be achieved.

According to the present embodiment, a sign of failure can be detected precisely. In addition, according to the present embodiment, indicating the time remaining before the tool (tool 213) becomes unusable enables an increase in efficiency of user maintenance.

Next, the second embodiment is described. Parts that are the same parts of the first embodiment described above are designated with like reference numerals and are not described.

In the first embodiment, the model created based on past detection information used to execute diagnostic processing for determining the level of degradation and the remaining time of the tool (tool 213). In the present embodiment, subsequent diagnostic processing is executed while the model is updated to a model that reflects the current detection information.

Figure 10:
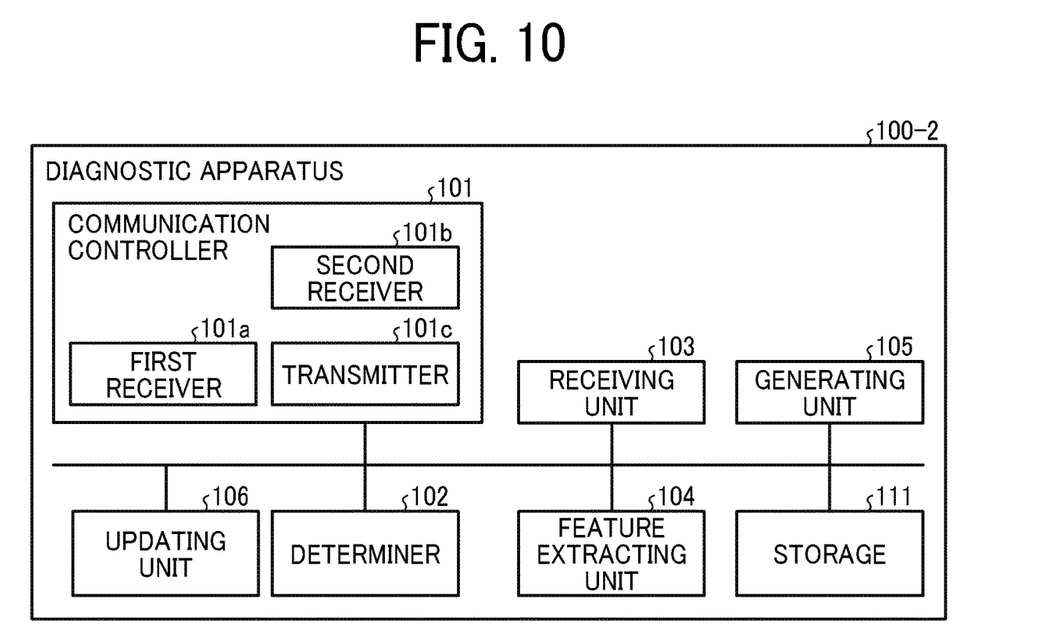
FIG. 10 is a block diagram illustrating an example of a functional configuration of a diagnostic apparatus of the diagnostic system of FIG. 1, according to a second embodiment.

FIG. 10 is a block diagram illustrating an example of a functional configuration of a diagnostic apparatus 100-2 according to the second embodiment. As illustrated in FIG. 10, the diagnostic apparatus 100-2 includes an updating unit 106 in addition to the communication controller 101, the determiner 102, the receiving unit 103, the feature extracting unit 104, the generating unit 105, and the storage 111 described in the first embodiment. The updating unit 106 is described below.

The updating unit 106 carries out updating processing on models that are used for determining the level of degradation of the tool (tool 213) and stored in the storage 111 for respective combinations of the context information and the tool information.

Figure 11:
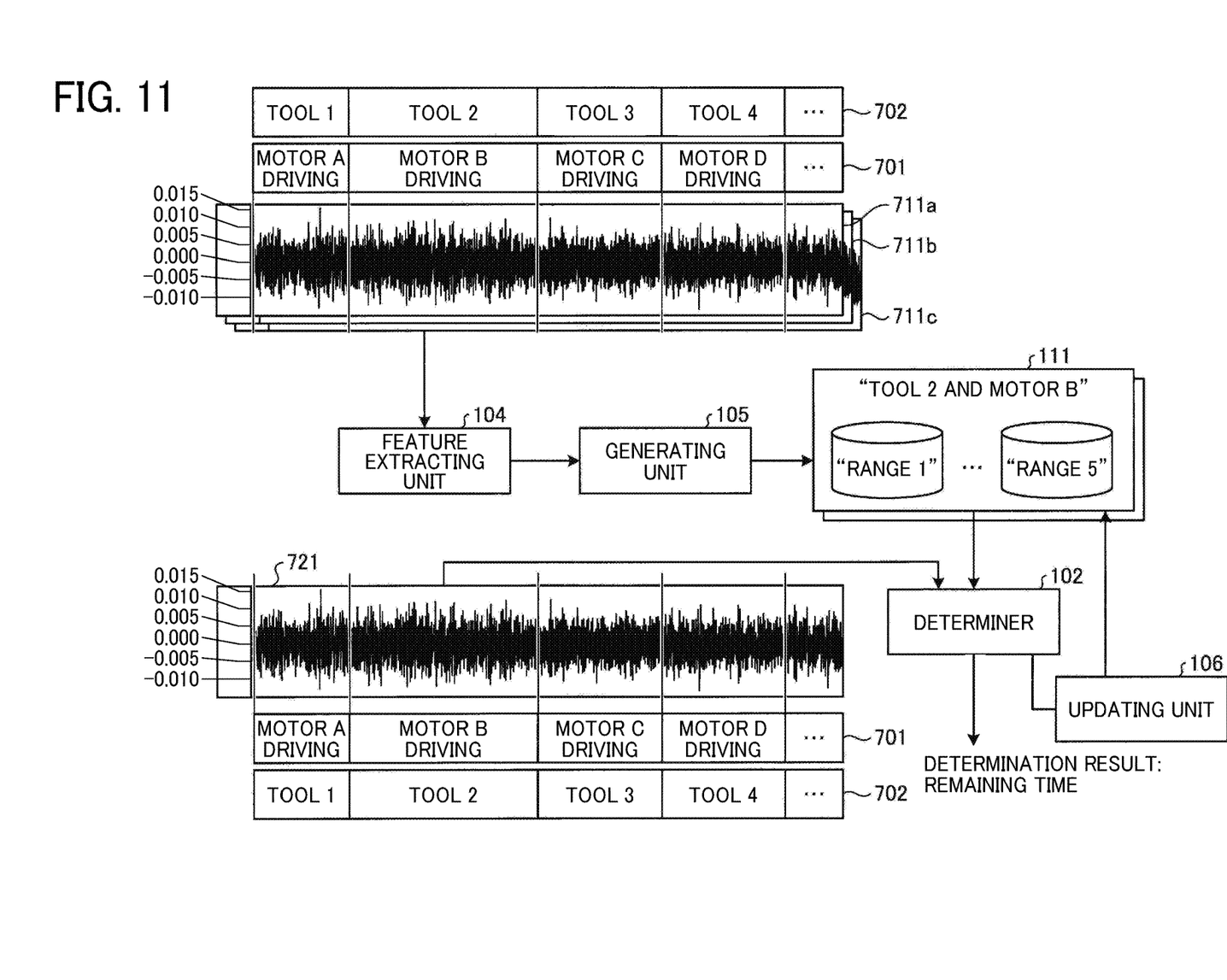
FIG. 11 is a diagram for explaining a specific example of processing that involves model update processing, according to the second embodiment.

FIG. 11 is a diagram for explaining a specific example of processing that involves model update processing. As illustrated in FIG. 11, when the context information 701 indicates that "Motor B is driven" and the tool information 702 indicates that "Tool 2 is used", for example, the determiner 102 uses the detection information received during the time in which the context information 701 and the tool information 702 are received and the model "Tool 2 and Motor B" stored in the storage 111, and determines the remaining usable time of Tool 2, which is used in the working machine 200.

Additionally, the updating unit 106 updates the model "Tool 2 and Motor B" stored in the storage 111 according to the level of degradation determined by the determiner 102 on the basis of the detection information that is received during the time in which the context information 701 and the tool information 702 are received.

More particularly, in updating the model, the updating unit 106 uses the level of degradation determined by the determiner 102, determines which model of a "Range" to update, and updates the determined model.

As described in the first embodiment, the determiner 102 selects the level of degradation corresponding to the model that has been calculated to have the highest likelihood as the level of degradation with respect to the received detection information. Therefore, the updating unit 106 is capable of determining the model to be updated as the model of a "Range" that has been calculated to have the highest likelihood.

The updating unit 106 uses the received detection information and creates (updates) the model. The model may be created (updated) by any method. However, for example, a model, e.g., a GMM and a HMM, and a corresponding model learning method can be applied.

For example, when the tool (tool 213) is practically changed to a new tool (tool 213), the updating unit 106 updates the model for determining the level of degradation on the basis of a degree of change of the feature information (e.g., operation sound) included in the detection information that has been used in the working machine 200.

According to the present embodiment, subsequent diagnostic processing is executed while the model is updated to a model that reflects the current detection information, enabling more precise detection of a sign of failure.

A program executed by the diagnostic apparatus of the present embodiment is preliminarily stored in the ROM or the like.

The program to be executed by the diagnostic apparatus of the present embodiment may be an installable or executable file that is recorded in a computer readable recording medium, e.g., a CD-ROM, a flexible disk (FD), a CD-R, and a digital versatile disk (DAM), and provided as a computer program product.

Furthermore, the program to be executed by the diagnostic apparatus of the present embodiment may be stored in a computer that is connected to a network, e.g., the Internet, and downloaded via the network. In addition, the program to be executed by the diagnostic apparatus of the present embodiment may be provided or distributed via the network, the Internet.

The program to be executed by the diagnostic apparatus of the present embodiment is a modular arrangement that includes the aforementioned units (e.g., the communication controller 101 and the determiner 102). As hardware in practice, the CPU (processor) reads a program from the aforementioned ROM and executes the program so that the aforementioned units are loaded and generated on a main memory.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A diagnostic apparatus comprising:
a receiver to receive, from a target device, context information corresponding to a current operation on the target device and tool information regarding a tool being used for the current operation on the target device, the context information being one of a plurality of items of context information corresponding to one of a plurality of operations applicable to the target device; and
circuitry to:
obtain detection information of a physical quantity varying with the current operation on the target device; and
determine a level of degradation of the tool being used, using the detection information and a model corresponding to a combination of the context information received and the tool information received, the model being specified from one or more models respectively corresponding to available combinations of context information and tool information using the combination of the context information received and the tool information received.

2. The diagnostic apparatus of claim 1, wherein the circuitry further configure to calculate time remaining before the tool becomes unusable based on the level of degradation of the tool.

3. The diagnostic apparatus of claim 1,
wherein the circuitry is further configured to use, as the detection information received for degradation level determination, one or more pieces of the detection information received during a time period specified by the context information received.

4. The diagnostic apparatus of claim 1, wherein the detection information includes a plurality of pieces of detection information corresponding to respective plurality of different physical quantities, and
the circuitry is further configured to use, as the detection information received for degradation level determination, one or more pieces of the detection information specified depending on the combination of the context information received and the tool information received.

5. The diagnostic apparatus of claim 1, wherein, when there is no model corresponding to the combination of the context information received and the tool information received, the circuitry is further configured to generate a model corresponding to the combination of the context information received and the tool information received, using the detection information corresponding to the combination of the context information received and the tool information received.

6. The diagnostic apparatus of claim 1, wherein the circuitry is further configured to update the model corresponding to the combination of the context information received and the tool information received using the detection information received, the detection information received being specified with the combination of the context information received and the tool information received.

7. The diagnostic apparatus of claim 1, wherein the circuitry is further configured to:

calculate a degree of possibility as to which level of degradation stage among a plurality of stages, feature information extracted from the detection information received corresponds, using each of the models respectively corresponding to each of the plurality of stages; and select a level of degradation corresponding to one of the models used to calculate the level of degradation stage having a relatively highest degree of possibility.

8. The diagnostic apparatus of claim 1, wherein the one or more models generated, respectively, for a plurality of ranges of a time period from a time when use of the tool begins to a time when the tool becomes unusable, through learning using feature information extracted from the detection information corresponding to a combination of the tool information and the context information.

9. The diagnostic apparatus of claim 1, wherein the context information includes a use time corresponding to a time of use of a driver included in the target device.

10. The diagnostic apparatus of claim 1, wherein the tool information includes information of a tool driven by a driver included in the target device.

11. The diagnostic apparatus of claim 1, wherein the receiver is further configured to receive the detection information of the physical quantity from the target device.

12. A diagnostic system comprising:
the diagnostic apparatus of claim 1; and
the target device subjected to diagnosis of the diagnostic apparatus, the target device including:
a detecting unit to detect the physical quantity; and
a transmitter to transmit the detection information of the physical quantity to the diagnostic apparatus.

13. A diagnostic system comprising:
the diagnostic apparatus of claim 1;
the target device subjected to diagnosis of the diagnostic apparatus; and
a detecting unit to detect the physical quantity, and to transmit the detection information of the physical quantity to the diagnostic apparatus.

14. A diagnostic method, performable by a diagnostic apparatus, the method comprising:
receiving, from a target device, context information corresponding to a current operation on the target device and tool information regarding a tool being used for the current operation on the target device, the context information corresponding being one of a plurality of items of context information corresponding to one of a plurality of operations applicable to the target device;
obtaining detection information of a physical quantity varying with the current operation on the target device; and
determining a level of degradation of the tool being used, using the detection information and a model corresponding to a combination of the context information received and the tool information received, the model being specified from one or more models respectively corresponding to available combinations of context information and tool information using the combination of the context information received and the tool information received.

15. A non-transitory recording medium storing a computer program which, when executed by one or more processors, causes the one or more processors to perform a diagnostic method, performed by a diagnostic apparatus, the diagnostic method comprising:
receiving, from a target device, context information corresponding to a current operation on the target device and tool information regarding a tool being used for the current operation on the target device, the context information corresponding to being one of a plurality of items of context information corresponding to one of a plurality of operations applicable to the target device;
obtaining detection information of a physical quantity varying with the current operation on the target device; and
determining a level of degradation of the tool being used, using the detection information and a model corresponding to a combination of the context information received and the tool information received, the model being specified from one or more models respectively corresponding to available combinations of context information and tool information using the combination of the context information received and the tool information received.

16. The diagnostic method of claim 14, further comprising:
calculating time remaining before the tool becomes unusable based on the level of degradation of the tool.

17. The diagnostic method of claim 14, further comprising:
using, as the detection information received for degradation level determination, one or more pieces of the detection information received during a time period specified by the context information received.

18. The diagnostic method of claim 14, wherein the detection information includes a plurality of pieces of detection information corresponding to respective plurality of different physical quantities, and wherein the diagnostic method further comprises:
using, as the detection information received for degradation level determination, one or more pieces of the detection information specified depending on the combination of the context information received and the tool information received.

19. The non-transitory recording medium of claim 15, wherein the computer program, when executed by the one or more processors, causes the one or more processors to perform the diagnostic method, the diagnostic method further comprising:
calculating time remaining before the tool becomes unusable based on the level of degradation of the tool.

20. The non-transitory recording medium of claim 15, wherein the computer program, when executed by the one or more processors, causes the one or more processors to perform the diagnostic method, the diagnostic method further comprising:
  using, as the detection information received for degradation level determination, one or more pieces of the detection information received during a time period specified by the context information received.

* * * * *